Figure 1:
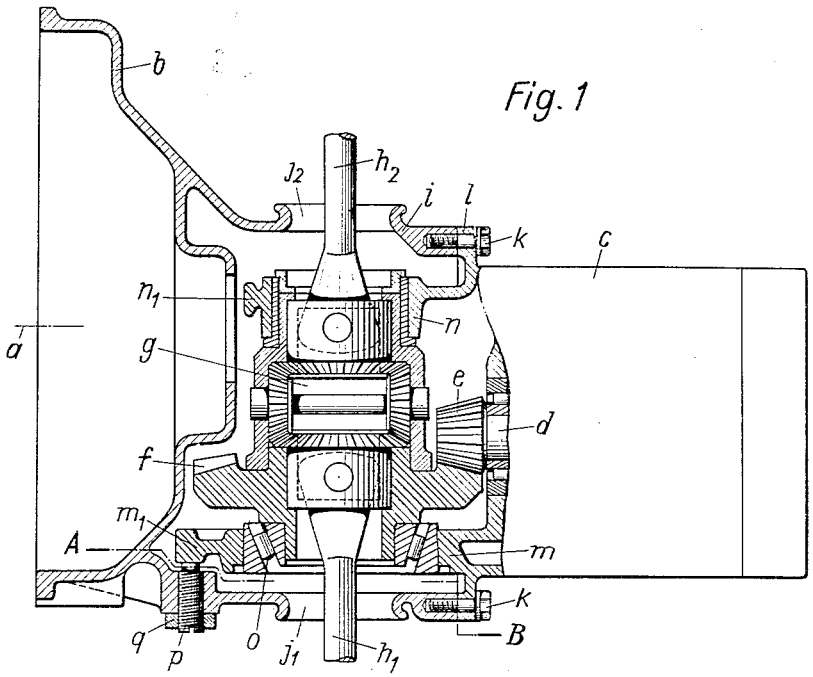

Dec. 20, 1955  J. MULLER ET AL  2,727,409
GEAR TRANSMISSION
Filed March 28, 1950

INVENTOR.
JOSEF MULLER
JOSEPH DAUBEN
BY
Haseltine, Lake & Co.
AGENTS

United States Patent Office 2,727,409
Patented Dec. 20, 1955

2,727,409

GEAR TRANSMISSION

Josef Muller and Joseph Dauben, Stuttgart, Germany, assignors to Daimler-Benz Aktiengesellschaft, Stuttgart-Unterturkeim, Germany Application March 28, 1950, Serial No. 152,396

Claims priority, application Germany March 31, 1949

7 Claims. (Cl. 74—700)

The invention refers to a gear transmission with a casing containing a transverse drive, combined with another casing to form an integral block arranged between two other casings, in particular for a drive with an axle gear of motor vehicles inserted between the motor and the change speed gear. The general objects of the invention are to provide an improved construction, an improved manufacturing and an improved assemblage of such gears.

In the aforementioned arrangement of the gear it is extremely difficult to build the axle gear, which is for example arranged between the motor and the change speed gear, with the required accuracy of adjustment. In addition such a drive aggregate becomes relatively heavy, if, in accordance with the usual manner of construction, all casings in which parts of gears like toothed wheels or the like are arranged, are made of iron castings, or of a material suitable as a support for the gear parts.

One particular object of the invention is to insure a faultless possibility of adjustment of the gear parts for the transverse drive (e. g. of a pinion and of an axle drive bevel wheel driven by it) and a further object is to save weight and space with the simultaneous achievement of particular advantages in casting.

It is therefore a feature of the invention that the bearings for the transverse drive are arranged independently from the transverse drive gear (e. g. axle gear casing), which is inserted in between the bearings, these being mounted on or within one of the two adjoining casings, for example that of the change speed gear. The bearings can hereby consist of one part integral with the corresponding casing, or can be applied thereto in an appropriate manner, for example by bolting.

In this manner it is possible to assemble the transverse gear independently from the transverse gear casing, which surrounds it, so that for example the pinion and bevel wheel of the axle drive can be adjusted with great accuracy, while the possibility of observation is unhampered. At the same time there is the advantage that the casing does not have to take up the thrust of the bearings and can consequently be manufactured of light metal, whereby for example it can be united with the motor clutch casing as an integral casing unit and thereby contributes to shorter time of construction and alleviation of the weight of the aggregate. Only the bearings for the transverse drive itself are suitably manufactured from cast iron.

In order to avoid an undesirable deflection of the transverse drive bearings due to the one-sided unsupported arrangement, and to be able to keep them as light as possible, the invention provides further, in particular in the case of such bearings, for a particular axial support of the unsupported bearing. In the case of the invention such a support can be carried out in a most simple manner against the surrounding axle gear casing. The support is hereby developed in an adjustable manner, e. g. as an adjustment screw.

Figure 2:
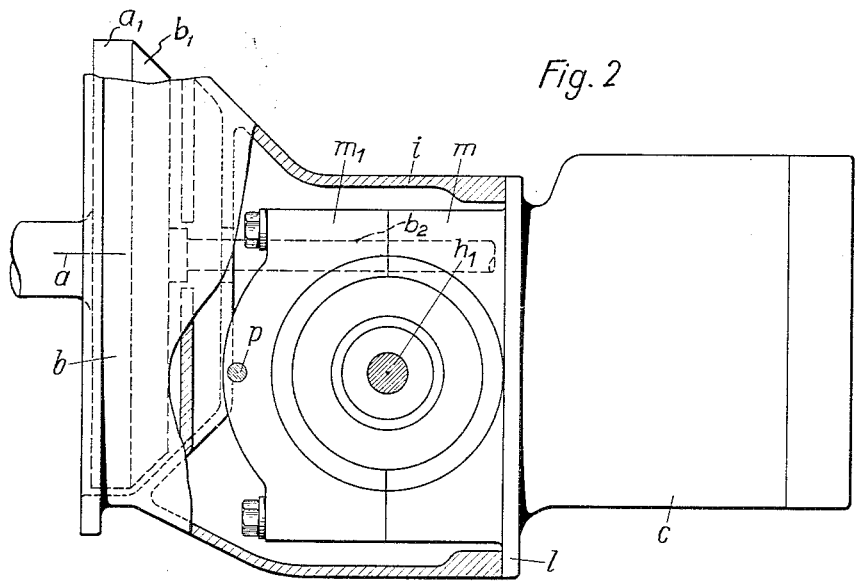

In the drawing an example of construction of the invention for motor vehicle gears is illustrated, wherein Figure 1 shows a horizontal longitudinal section through the axle gear casing on one level with the transverse drive with the adjoining motor clutch casing and adjoining the change gear casing and Figure 2 shows a side view of the gear in accordance with Figure 1, in part in a section along line A—B of Figure 1.

From the motor crankshaft and fly wheel $a_1$, the axis of which is indicated by $a$, the change speed gear in the rear is driven through the motor clutch $b_1$, which is arranged in the clutch casing $b$ and through a longitudinal shaft $b_2$, which is arranged in the same axial direction. The returning countershaft $d$ of the change speed gear is driven by the main shaft of the gear through various speed ratios. From the countershaft the drive is transferred through the pinion $e$, the axle drive bevel wheel $f$ and the differential gear unit $g$ to the cross shafts $h_1$ and $h_2$ (e. g. the axle shafts for a front-wheel drive). The axle gear, which consists of the axle drive bevel wheel $f$ and the differential gear unit $g$, is surrounded by a casing $i$, integral with the clutch casing $b$ and provided with passages $j_1$ and $j_2$ for the axle shafts $h_1$ and $h_2$. The casing unit $b$, $i$ is flanged to a corresponding flange 1 of the change speed gear casing $c$ by means of a flange, which has for example the form of a ring or is shaped in an appropriate manner.

According to the invention the bearings $m$ and $n$ for the axle drive bevel wheel $f$ and the differential gear unit $g$ are mounted on the change speed gear casing $c$. They are both shaped in two parts in such a manner that the first pair of halves of the bearings are integral with the change speed gear casing $c$, while the second halves are screwed on the appropriate first halves of the bearings as covers $m_1$ and $n_1$. In order to absorb safely the axial pressure exercised by the pinion $e$ on the drive bevel wheel $f$ and thereby through the roller or ball bearings $o$ on the bearing $m$, $m_1$, and also to avoid a too strong and undesirable deflection of the same in spite of a relatively light construction of the bearing, provision is made in the casing $i$ for an adjustment screw $p$ to support the bearing in an axial direction, which screw can be adjusted into the position, and if necessary can be secured by a safety lock-nut $q$. It is necessary that the change speed gear casing $c$ and the bearings $m$ and $n$ consist of heavy metal, in particular of cast iron castings or the like, which is suitable for the mounting of the gear parts, while the clutch casing $b$ and the axle gear casing $i$ integral therewith are suitably cast of light metal.

The assembling of the gear is carried out in such a manner that the change speed gear together with the axle gear are mounted together outside the casing $i$. The axle gear is arranged in such a manner that it is easily accessible and can be easily observed so that this drive bevel wheel $f$ and the pinion $e$ can be adjusted with reference to each other with the accuracy required for the faultless working of the gear. The change speed and axle gear, which is mounted in this manner, is then inserted from the right side into the axle gear casing $i$, which is empty except for the clutch shaft $b_2$, and held to the axle gear casing by means of the screws $k$. Then the axle shafts $h_1$ and $h_2$ are inserted into the differential gear unit $g$ from the side through the openings $j_1$ and $j_2$ by appropriate coupling pieces.

The invention is in particularly applicable for front-wheel drives or rear engine drives of motor vehicles. However, it can also be utilized for other purposes.

If necessary, the bearings $m$, $n$ can also be attached to the change speed gear casing in a detachable manner, e. g. they can be connected to it by means of screws, whereby they can for example form a common bearing ring with longitudinal axle. However, the integration of at least one-half of the bearings $m$ and $n$ with the gear casing $c$ has the advantage of greater stability and rigidity of the arrangement.

What we claim is:

1. Gear transmission comprising two separately constituted casings separably combined into a single block, drive members in one of the casings, drive means for the drive members extending through both casings, further drive members in the other casing extending transverse to the drive means, and at least one bearing in the second casing supported by the first casing and in turn supporting the further drive members.

2. Gear transmission comprising three consecutive casings connected into a single block, drive members in one end casing, drive means for the drive members extending through all three casings, drive elements extending through the intermediate casing transverse to the axis of the drive means, and bearings for the drive elements inside the intermediate casing and supported by the said end casing.

3. Gear transmission for motor vehicles having an engine housing, comprising a change gear casing, an axle drive casing constituted separately from the change gear casing and separably combined therewith into a single casing block, a first shaft system extending from the engine housing in longitudinal direction through one casing and into the other, a second shaft system crossing the first shaft system for the axle drive, and bearings for the second shaft system, located within the one casing traversed by the first shaft system and supported by the other casing independently of the one casing, the parting surface between the two casings being spaced from the axes of the bearings towards the change gear casing.

4. Gear transmission for motor vehicles, comprising a motor casing, an adjoining axle gear casing and an adjoining change gear casing, whereby all three casings form one casing block, at least the change gear casing being constituted separately from the others, a gear drive system extending from the motor casing through the axle gear casing into the change gear casing, an axle drive system extending transverse to the gear drive system through the axle gear casing, means for driving the axle drive system from the gear drive system, and bearings for the axle drive system located within the axle drive casing, and supported by the change gear casing independently of the axle gear casing, the parting surface between the two casings being spaced from the axes of the bearings towards the change gear casing.

5. Gear transmission for a motor vehicle comprising an axle drive casing, a change gear casing attached to the axle drive casing, axle drive means in the axle drive casing arranged transverse to the longitudinal direction of the transmission, gear means in the change gear casing, transfer gear means for transmitting the drive from the gear means to the axle drive means in such a manner as to exert an axial thrust on the axle drive means, two bearings located inside the axle drive casing to support the axle drive means and supported by the change gear casing, at least one of the bearings taking up the said axial thrust, and means for the axial support of the said bearing against the axle drive casing.

6. Gear transmission for motor vehicles having a drive motor, comprising first gear members included in an axle drive and second gear members included in a change gear mechanism, means for driving the gear members from the drive motor, a first casing for the first gear members and a second casing for the second gear members, said casings being directly separably connected together, the one of said casings furthest removed from the side of said gear members which is connected to the drive motor by said driving means being provided with bearing means for said first and second gear members extending therefrom into the other of said casings.

7. Gear transmission for motor vehicles having a motor housing, comprising two gear casings arranged in line with the motor housing, first gear members included in an axle drive contained in one of the casings, second gear members included in a change gear mechanism and contained in the other casing, the motor housing and the casings being connected together to form a block and the casing furthest removed from the housing being separably connected and provided with bearing means for said first and second gear members extending therefrom into the other of said casings.

References Cited in the file of this patent

UNITED STATES PATENTS

| | | |
|---|---|---|
| 1,106,149 | Loomis | Aug. 4, 1914 |
| 1,139,674 | Gruenfeldt | May 18, 1915 |
| 1,180,715 | Heaslet | Apr. 25, 1916 |
| 1,363,882 | Klocke | Dec. 28, 1920 |
| 1,391,294 | Barberon | Sept. 20, 1921 |
| 1,571,801 | Rockwell | Feb. 2, 1926 |
| 1,938,201 | Wells | Dec. 5, 1933 |
| 1,987,716 | Skelton | Jan. 15, 1935 |
| 2,057,140 | Ehrlich | Oct. 13, 1936 |
| 2,187,614 | Ormsby | Jan. 16, 1940 |
| 2,245,078 | Padgett | June 10, 1941 |
| 2,249,035 | Peterson | July 15, 1941 |
| 2,459,705 | Julien | Jan. 18, 1949 |
| 2,546,969 | Buckendale | Apr. 3, 1951 |

FOREIGN PATENTS

| | | |
|---|---|---|
| 633,317 | France | Oct. 22, 1927 |
| 645,829 | France | July 3, 1928 |
| 648,343 | France | Dec. 7, 1928 |
| 654,589 | Great Britain | June 20, 1951 |
| 673,691 | France | Oct. 8, 1929 |